United States Patent [19]

Winchester et al.

[11] Patent Number: 4,675,256
[45] Date of Patent: Jun. 23, 1987

[54] THERMAL BATTERY COMPRISING IRON PYRITE DEPOLARIZER AND FERRIC SULFATE ADDITIVE

[75] Inventors: Clinton S. Winchester, Beltsville; Mark T. Williams, Owings Mills, both of Md.

[73] Assignee: Mine Safety Appliances Company, Pittsburgh, Pa.

[21] Appl. No.: 877,804

[22] Filed: Jun. 24, 1986

[51] Int. Cl.⁴ .............................................. H01M 6/36
[52] U.S. Cl. ..................................... 429/112; 429/221
[58] Field of Search ....................... 429/112, 221, 232; 252/182.1

[56] References Cited

U.S. PATENT DOCUMENTS

| | | | |
|---|---|---|---|
| 4,119,769 | 10/1978 | Schneider et al. | 429/112 |
| 4,132,547 | 1/1979 | Buzzelli et al. | 429/221 X |
| 4,163,829 | 8/1979 | Kronenberg | 429/194 |
| 4,383,014 | 5/1983 | Armijo et al. | 429/112 |

Primary Examiner—Anthony Skapars

[57] ABSTRACT

Ferric sulfate is added to the iron pyrite depolarizer of a thermal battery to provide a predetermined voltage transient on activation of the battery.

5 Claims, 1 Drawing Figure

THERMAL BATTERY COMPRISING IRON PYRITE DEPOLARIZER AND FERRIC SULFATE ADDITIVE

FIELD OF THE INVENTION

This invention relates to an improved depolarizer for use in primary reserve batteries, known as thermal batteries, that are activated by heating.

BACKGROUND OF THE INVENTION

Thermal batteries are a well-known type of primary reserve battery that have a long shelf life at ordinary temperatures and are actuated by heating to a temperature that melts a salt electrolyte. The batteries are useful in applications for a high energy output over a short time. The batteries comprise a plurality of cells, each of which includes an anode, a cathode, an electrolyte and a heat source, usually an ignitable exothemically reactive chemical charge or pyrotechnic. A variety of electrochemical systems are known for use in thermal cells.

The anode is an electropositive metal, commonly calcium, lithium alloys solid at the battery operating temperature or molten lithium as described in U.S. Pat. No. 3,930,888, U.S. Pat. No. 3,891,460, U.S. Pat. No. 4,221,849, and the application of Clinton S. Winchester, Ser. No. 554,005, filed Nov. 23, 1983, of common ownership with this application. The electrochemical reactant of the cathodes, referred to as depolarizers, are electronegative materials that are reduced in the electrochemical cell reaction and include phospates, borates, metal oxides and chromates. U.S. Pat. No. 4,119,769 discloses the use of an iron pyrite ($FeS_2$) depolarizer. Under current practice powdered iron pyrite is mixed with electrolyte, and sometimes binder, and compacted to form a homogeneous wafer cathode, which may be a catholyte layer of a composite wafer also having an anolyte layer comprising electrolyte and binder. The electrolytes are ordinarily mixtures of alkali metal halides, most often a eutectic mixture of lithium chloride and potassium chloride.

It has been known that thermal batteries having an iron pyrite depolarizer exhibit an initial peak voltage transient (spike) that has been attributed to the presence of free sulfur in the pyrite (Dand and Press, *Improved Thermal Battery*, AFAPL-TR-79-2027, April 1979) or surface impurities resulting from the reaction of $FeS_2$ and atmospheric oxygen (Levy and Craftsm *Studies of the Abnormally High Peak Voltage Observed with $FeS_2$ Depolarized Thermal Batteries*, SAND 79-0090, Sandia Laboratories, April 1979). In some applications the voltage transient is undesirable and additive $CaSi_2$ has been added to the depolarizer to suppress it (U.S. Pat. No. 4,383,014).

In some systems, however, high voltages are used to activate electronic circuitry, and voltage transients are desirable. The voltage transients using iron pyrite depolarizers are not sufficiently reliable and reproduceable for such purposes, the transients are variable from lot to lot of pyrite, and iron pyrite alone may not give a sufficiently high voltage spike of the necessary duration.

SUMMARY OF THE INVENTION

It is an object of this invention to provide a thermal battery that produces on activation an initial voltage transient of predetermined magnitude and duration, and an improved depolarizer therefor.

The batteries of this invention comprise an iron pyrite depolarizer having incorporated therein an amount of ferric sulfate, $Fe_2(SO_4)_3$, effective to produce the voltage transient.

DESCRIPTION OF THE PREFERRED EMBODIMENTS

Figure 1:
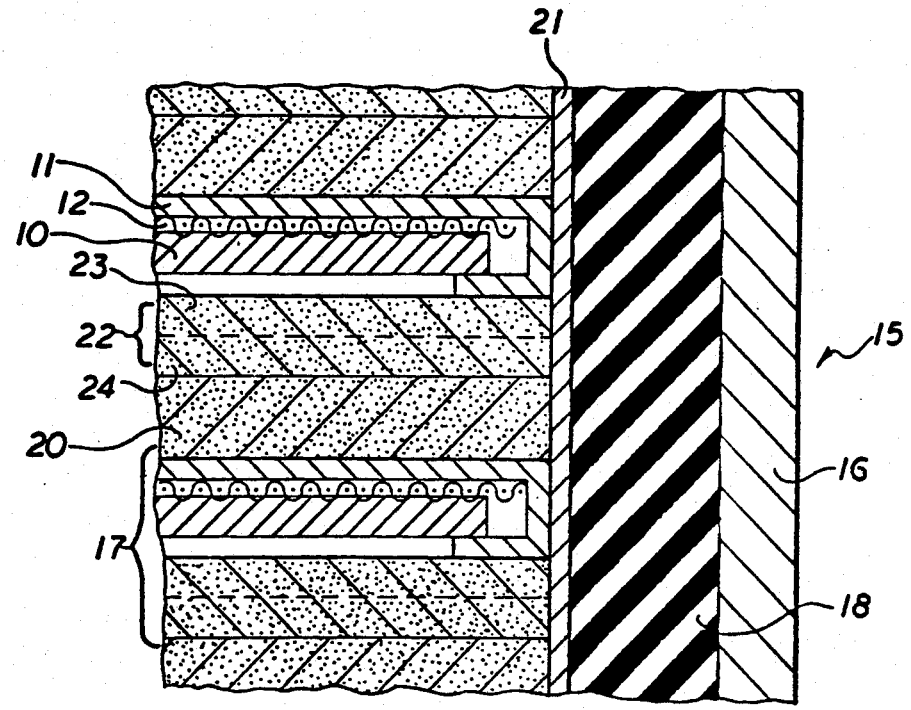
FIG. 1 is a breakaway sectional elevation of a battery cell stack of this invention.

A thermal battery 15 typically utilizes a plurality of cells 17 comprising anodes and cathodes in a stacked array which is housed in a metal housing 16, usually of cylindrical configuration. Each of the cells are separated from the housing by thermal and electrical insulation 18.

The anode preferably comprises a disc 10 of lithium (18% by weight) and iron powder (82% by weight) positioned in a metal cup 11. A stainless steel screen is interposed between cup 11 and anode disc 10. Other alkali or alkaline earth metal anodes may be used, including calcium, magnesium and lithium alloys that are solid at the battery operating temperature, such as LiSi alloys.

The cathode 22 preferably consists of an anolyte layer 23 and a catholyte or depolarizer layer 24. The preferred anolyte layer 23 comprises a mixture of LiCl (45% by weight) and KCl (55% by weight) eutectic which is blended with magnesium oxide in a ratio of 1 to 1, fused at a temperature of from 380° to 395° C. for about 16 hours and ground to pass a 60-mesh screen.

A preferred catholyte layer 24 contains dried, granular ferric sulfate, preferably from about 0.4% to 7.7% by weight, the remainder being 25% by weight of electrolyte (LiCl-CKl eutectic) and 75% iron pyrite. Higher proportions of ferric sulfate up to about 30% by weight can be used, but increased amounts over the preferred range give little additional increase of the peak voltage. The catholyte may also contain binders, such as magnesia and silica, and electronic conductive additives such as carbon. Suitable catholyte layers may contain from 40% to 80% iron disulfide, 15% to 40% electrolyte, 0.4% to 30% ferric sulfate, 0% to 5% binder and 0% to 5% of electronic conductor.

Completing each cell is an ignitable chemical heat source 20 which is ignited by fuse strip 21 which is in turn connected to an electrical match or squib, not shown, to activate the battery.

The conventional iron pyrite depolarized lithium battery gives a maximum open circuit voltage per cell of about 2.27 V. Through addition of ferric sulfate, the open circuit output voltages can be driven to about 2.7 V/cell. The addition of ferric sulfate to the pyrite depolarizer also reduces the activation time required to reach a given voltage level; activation slopes of conventional pyrite batteries typically are 100 to 200 V/sec., compared to 300 to 7000 V/sec. with depolarizer containing ferric sulfate.

Ferric sulfate is thermally unstable at operational temperatures using eutectic LiCl-KCl electrolyte (m.p. 352° C.) and decomposes to yield iron disulfide. Thus, ferric sulfate not electrochemically utilized in the initial spike enriches the catholyte in iron disulfide. Depending on the battery configuration and operating temperature, high voltage transients can be maintained for ½ to 40 seconds or longer.

EXAMPLE 1

Batteries in accordance with FIG. 1 comprising 28 cells were assembled using conventional iron pyrite depolarizers in accordance with U.S. Pat. No. 4,221,849, having an anolyte layer of 50% MgO, and 50% LiCl-KCl eutectic and a catholyte layer of 75% by weight iron pyrite and 25% by weight LiCl-KCl eutectic. Identical batteries were prepared, except that the designated amounts of ferric sulfate was substituted for a corresponding amount of iron pyrite-eutectic in the catholyte. In all instances the materials used were dried, granulated to pass a 60-mesh screen, mixed and compacted into a wafer. The batteries were preconditioned before firing to a temperature of −25° F. (cold) or 140° F. (hot). Table I sets forth the peak voltage reached by the voltage spike under the indicated conditions of preconditioning and load.

TABLE I

| % Ferric Sulfate | 0% (Prior Art) | 0.44% | 0.87% | 1.7% | 4.0% | 7.7% |
|---|---|---|---|---|---|---|
| Conditions | | | | | | |
| Hot, 200 ohm load | 2.20 | 2.33 | 2.36 | 2.45 | 2.57 | 2.68 |
| Cold, 200 ohm load | 2.17 | 2.28 | 2.34 | 2.43 | 2.56 | 2.70 |
| Hot, 4 ohm load | 1.96 | 2.10 | 2.12 | 2.21 | 2.36 | 2.46 |

It will be apparent to those skilled in the art that this invention may be practiced, within the scope of the claims, otherwise than exemplified.

We claim:

1. In a thermal battery having a salt electrolyte, means to activate the battery by melting the electrolyte, and a $FeS_2$ depolarizer, the improvement wherein the depolarizer comprises an amount of ferric sulfate effective to cause the occurrence of a voltage transient of predetermined magnitude and duration on activation of the battery.

2. A battery of claim 1 in which the amount of ferric sulfate is between about 0.4 and 7.7% by weight.

3. A battery of claim 1 in which the depolarizer comprises 40% to 80% by weight iron disulfide, 15% to 40% by weight electrolyte and 0.4% to 30% by weight ferric sulfate.

4. A battery of claim 3 in which the depolarizer contains 0–5% by weight carbon.

5. A battery of claim 3 in which the depolarizer containes a magnesia or silica binder.

* * * * *